United States Patent
Heinemann et al.

[11] 3,940,118
[45] Feb. 24, 1976

[54] BLADE LIFTER FOR INSTALLATION INSIDE A REVOLVING DRUM

[75] Inventors: Otto Heinemann, Ennigerloh; Rainer Philipp, Ahlen, both of Germany

[73] Assignee: Polysius AG, Neubeckum, Germany

[22] Filed: Aug. 31, 1973

[21] Appl. No.: 393,647

[30] Foreign Application Priority Data
Oct. 17, 1972 Germany............................ 7238023

[52] U.S. Cl. ................................................. 259/89
[51] Int. Cl.² ............................................ B01F 9/06
[58] Field of Search .......... 259/3, 81 R, 89; 51/164; 118/418

[56] References Cited
UNITED STATES PATENTS

| | | | |
|---|---|---|---|
| 924,051 | 6/1909 | Foster | 259/89 X |
| 1,220,130 | 3/1917 | Jackson | 259/89 |
| 1,501,566 | 7/1924 | Lundberg | 259/89 |
| 1,910,263 | 5/1933 | Seyffert | 259/89 |
| 2,504,378 | 4/1950 | Bell | 259/3 X |
| 2,553,464 | 5/1951 | McNeill | 259/89 |
| 2,815,940 | 12/1957 | Madsen | 259/89 X |

*Primary Examiner*—Daniel Blum
*Assistant Examiner*—Alan Cantor
*Attorney, Agent, or Firm*—Learman & McCulloch

[57] ABSTRACT

The invention concerns a blade lifting member intended for installation inside a revolving drum and comprises a mounting plate for the scoop blade (lifting member) attached to the inner wall of the drum end of a curved blade shell extending from the mounting plate, the free rim of said blade forming a scoop edge pointing in the direction of rotation of the drum.

11 Claims, 3 Drawing Figures

BLADE LIFTER FOR INSTALLATION INSIDE A REVOLVING DRUM

Blade lifters for installation within a revolving drum are adapted to lift the material being treated within the drum as it rotates and in such manner that the material cascades back into the drum. In the case of prior art blade lifters, it has been observed that the lifting members which fill up with the material being treated at the lowest position of rotation of the drum, are emptied after a revolution (of the barrel shell) of about 100°. This then means that a cloud of the material being treated fills only little more than half of the drum cross section. Such method of operation of necessity leads to a poor efficiency of the revolving drum if it is to be used for cooling or heating the material undergoing treatment when a stream of gas is employed.

Therefore, an object of the present invention is to provide a blade lifter which ensures a gradual emptying of the lifting member over the entire cross section of the drum, while also being of economical construction.

In accordance with the invention, the radius of curvature of the blade shell is less within the region of the scoop edge than the radius of curvature of the blade shell within the area of attachment to the mounting plate.

When loose material is contained in the lower portion of a revolving drum, it assumes — viewed in profile — a slanted position inclined at a certain angle; this angle or this slanted position is present also for material located in a blade lifter of a revolving drum. The shape of the blade lifter of the present invention takes this into account and maintains a smaller radius of curvature for the blade shell within the area of the scoop edge, resulting in the fact that the last portion of the material to be treated and located inside the lifting member is dumped when the respective blade is traveling downward (as the drum rotates). In this way, a cloud of material is formed within the revolving drum which extends across the essential poortion of the drum cross section. This large cloud of loose material permits a most thorough contact of the individual particles of the goods with the treating gas fed through the revolving drum, achieving an improvement in the effectiveness of the treatment.

Due to the smaller radius of curvature of the blade shell within the area of the scoop edge, it is also possible to simultaneously achieve a saving in construction materials in comparison with prior art blade lifting members.

Embodiments of the invention are illustrated in more detail in the following description and drawings wherein.

Figure 1:
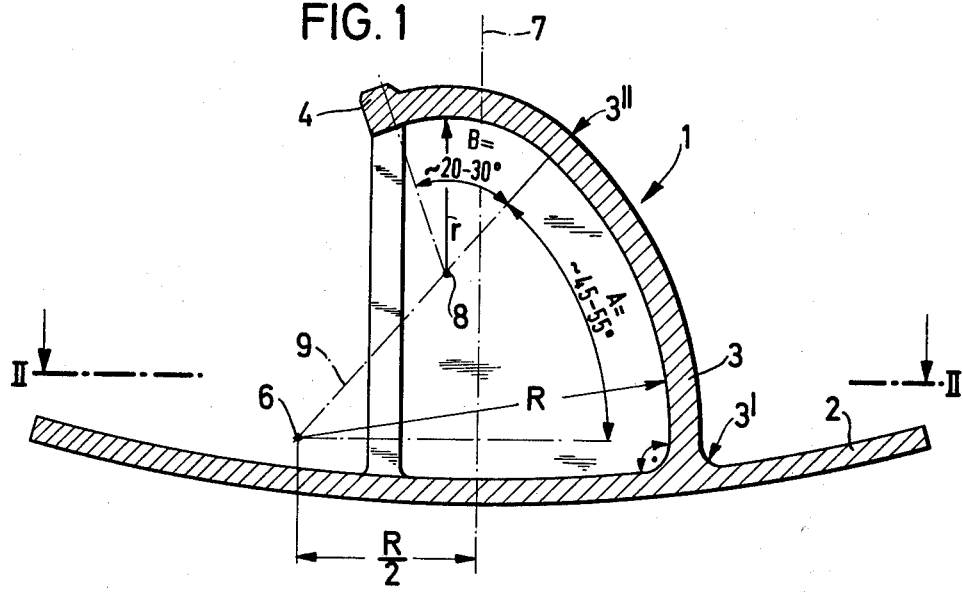
FIG. 1 is a cross section of a blade lifter according to the invention.
Figure 2:
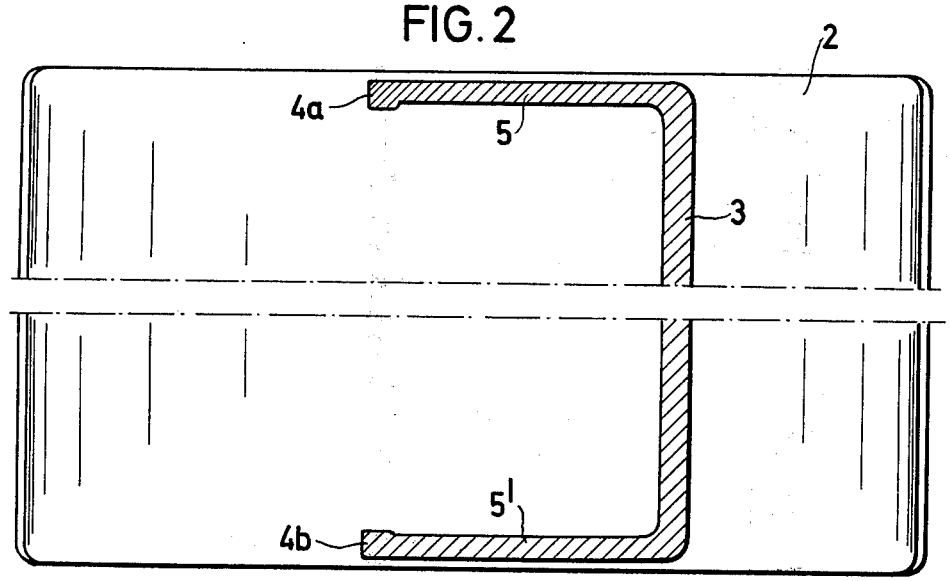
FIG. 2 is a partial plan view of the blade lifter shown in FIG. 1.

The blade lifting member 1 according to the invention as illustrated in FIGS. 1 and 2, and intended for installation in a revolving drum, contains a blade mounting plate 2 by means of which blade member 1 is attached to the inner wall of the drum, as well as a curved blade shell 3 extending from mounting plate 2. The free rim of blade shell 3 forms the scoop edge 4 pointing in the direction of rotation of the drum, which edge is reinforced or enlarged because of strong abrasion wear. At opposite sides of blade shell 3 of the embodiment represented, is attached a side plate 5, 5' forming one piece with blade shell 3, which plates have the same curvature as the blade shell. The scoop edges 4a, 4b pointing in the direction of rotation of the drum, of these side plates 5, 5' are approximately in the same plane with scoop edge 4 of blade shell 3 and join up with the latter in continuity; obviously, scoop edges 4a and 4b are also reinforced the same as scoop edge 4.

So that the blade lifting member of the invention can gradually empty the material picked up for treatment over the entire cross section of the drum during rotation of the drum, the radius of curvature of blade shell 3 is kept smaller within the area of scoop edge 4 than the radius of curvature of the blade shell within the area of its connection 3' to mounting plate 2. For this reason, the curvature of blade shell 3 has two radii R and r of different size. The larger radius R extending from mounting plate 2 thus determines the section of curvature A of about 45° to 55°, whereas the smaller radius of curvature r which immediately follows, determines a section of curvature B of about 20° to 30°. The ratio of the larger radius of curvature R to the smaller radius of curvature r lies between 1.5:1 and 2.5:1, preferably between 2.0:1 and 2.2:1. If blade lifter 1 of the invention is installed in a cooling pipe arranged in satellite fashion on a primary rotating tube, then the larger radius of curvature R is between 150 mm. and 200 mm. preferably between 160 mm. to 180 mm. and the smaller radius of curvature r amounts to 70 mm. to 100 mm., whereby the higher values essentially concern only blade lifter embodiments used in larger satellite cooling tubes.

Blade lifter 1 according to the invention is furthermore designed such that the curvature of the blade starts at mounting plate 2 with an angle of about 90°. Center point 6 of the larger radius of curvature R is located on the side opposite the connection 3' of the blade shell from the centerline 7 of the blade, and is located from the latter by half of the amount of the larger radius of curvature R, thus by R/2. Center point 6 of the larger radius R is suitably located on the mounting plate or just above it, the latter position being illustrated in the embodiment shown in FIG. 1. Center point 8 of the smaller radius of curvature r on the other hand, is suitably located on line 9 connecting center point 6 with the end portion 3'' of the section of curvature A pointing in the direction of rotation of the drum. Thereby the section of curvature B joins up at a tangent to the section of curvature A.

The blade lifting member of the invention is suitably cast as a single piece. So that this blade member on the one hand is of a comparatively lightweight construction and on the other hand possesses great rigidity and strength, one can construct the surface of the curved blade shell such that it has a profile manufactured in one piece with said shell.

Figure 3:
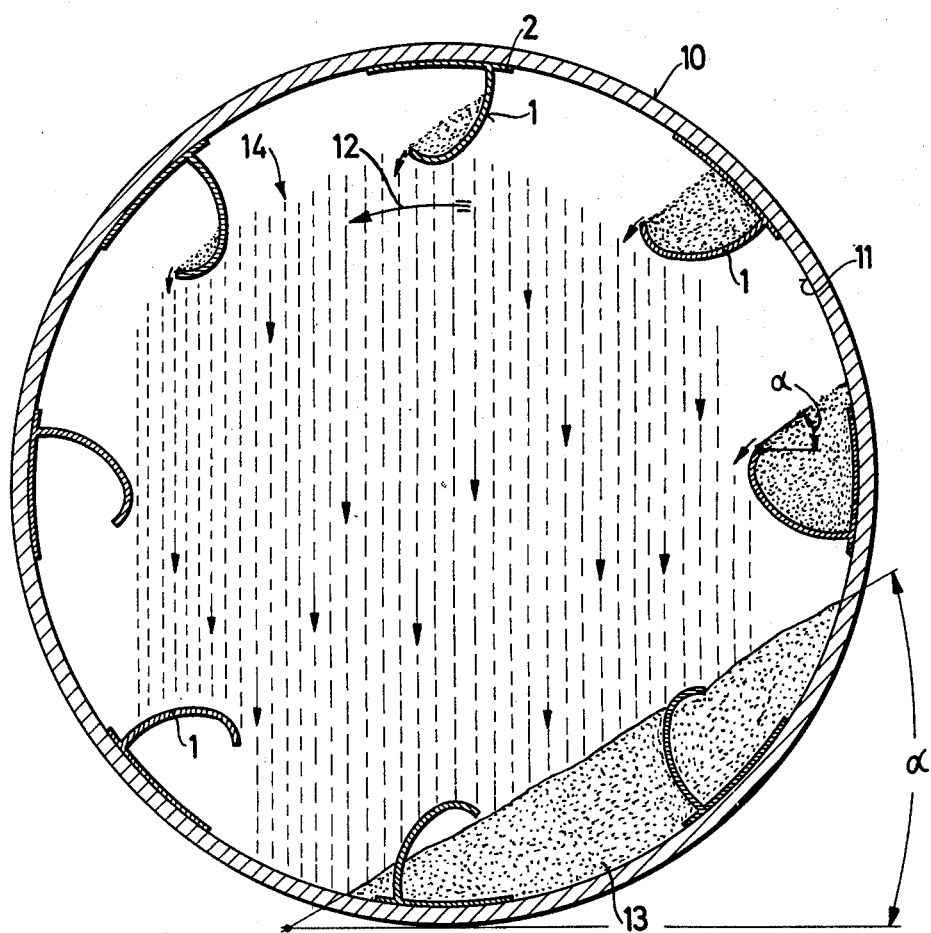
FIG. 3 is a cross section of a revolving tube with blade lifters of the invention attached to its inner wall.

FIG. 3 illustrates a cross section of a revolving drum 10, having several blade lifters 1 of the invention attached to its inner wall in suitable fashion by means of mounting plates 2. Inside of drum 10, rotating in the direction of arrow 12, is located the material 13 to be treated, which material assumes a position inclined at angle $\alpha$ in the lower portion of the drum because of the rotating motion. As the drum is rotated, each blade member 1 located at the bottom fills itself with the loose material to be treated. The material contained in blade lifter 1 forms a gradient α in the course of subsequent rotation, which gradient corresponds essentially to angle α so that in the course of rotating the revolving drum 10, the material little by little cascades by itself into the drum, whereby because of the curved blade shell of the invention, the last portion of this material falls out as the blade moves downward. This results in a cloud of loose material 14, which — as illustrated by the interrupted vertical lines — is distributed evenly across the larger portion of the drum cross section and thus ensures a most even and quick treatment of the material.

Finally, it should be mentioned that for some types of application it might also be suitable or sufficient to have the blade lifting member of the invention constructed without the front plates provided in the embodiments illustrated, and that the blade shell might also be curved such that its radius of curvature generally diminishes starting from the area of its connection to the mounting plate toward the scoop edge.

What is claimed is:

1. A rigid blade lifting member for installation on a revolving drum comprising a mounting plate member for attachment to said drum to rotate therewith; and a blade shell joined at one end to and extending from said mounting member, said shell having at its other end a free rim forming a scoop edge, said shell being curved continuously from its one end to its other end, the radius of curvature of said shell from its one end to a point between its ends closer to said other end than to said one end being greater than the radius of curvature of said shell from said point to said other end.

2. A blade lifting member according to claim 1 wherein the larger radius of curvature of said shell determines a section of curvature of about 45° to 55° and the smaller radius of curvature determines a section of curvature of about 20° to 30°.

3. A blade lifting member according to claim 2 wherein said shell forms an angle of about 90° to said mounting member at the juncture of said shell with said mounting member.

4. A blade lifting member according to claim 1 wherein the ratio of the larger radius to the smaller radius is between 1.5:1 and 2.5:1.

5. A blade lifting member according to claim 4 wherein said ratio is between about 2.0:1 and 2.2:1.

6. A blade lifting member according to claim 1 wherein the larger radius has its center adjacent said mounting member and located about half the length of that radius from the centerline of said shell and on that side of the centerline opposite the juncture of said shell with said mounting member.

7. A blade lifter according to claim 1 including side plates at opposite sides of said shell and having the same curvature as the latter.

8. A blade lifter according to claim 7 wherein said side plates have free ends and wherein said ends are reinforced.

9. A blade lifter according to claim 1 wherein said scoop edge is reinforced.

10. A blade lifter according to claim 1 wherein said shell comprises a one-piece structure.

11. A blade lifter according to claim 1 wherein said shell and said mounting member comprise a one-piece structure.

* * * * *